United States Patent

Tsukahara et al.

[11] Patent Number: 5,748,992
[45] Date of Patent: May 5, 1998

[54] CAMERA CONTROL DEVICE

[75] Inventors: Daiki Tsukahara, Hiratsuka; Hideya Inoue, Yokohama, both of Japan

[73] Assignee: Nikon Corporation, Tokyo, Japan

[21] Appl. No.: 774,895

[22] Filed: Dec. 27, 1996

Related U.S. Application Data

[63] Continuation of Ser. No. 605,363, Feb. 22, 1996, abandoned, which is a continuation of Ser. No. 386,215, Feb. 9, 1995, Pat. No. 5,515,130, which is a continuation of Ser. No. 233,082, Apr. 25, 1994, abandoned, which is a continuation of Ser. No. 801,042, Dec. 3, 1991, abandoned.

[30] Foreign Application Priority Data

Dec. 10, 1990 [JP] Japan .................. 2-409798
Dec. 11, 1990 [JP] Japan .................. 2-409981

[51] Int. Cl.$^6$ ............................................ G03B 13/02
[52] U.S. Cl. ................................................... 396/51
[58] Field of Search ........................ 396/51, 121, 122, 396/123, 234

[56] References Cited

U.S. PATENT DOCUMENTS

| | | | |
|---|---|---|---|
| 4,574,314 | 3/1986 | Weinblatt | 354/400 X |
| 4,836,670 | 6/1989 | Hutchinson | 354/62 |
| 5,003,339 | 3/1991 | Kikuchi et al. | 354/402 |
| 5,036,347 | 7/1991 | Tsunekawa et al. | 354/400 |
| 5,291,234 | 3/1994 | Shindo et al. | 354/402 |
| 5,296,888 | 3/1994 | Yamada | 354/402 |
| 5,333,029 | 7/1994 | Uchiyama et al. | 354/410 |
| 5,515,130 | 5/1996 | Tsukahara et al. | 354/402 |

FOREIGN PATENT DOCUMENTS

| | | |
|---|---|---|
| 1-241511 | 6/1989 | Japan . |
| 1-274736 | 7/1989 | Japan . |
| 2-032312 | 4/1990 | Japan . |

*Primary Examiner*—W. B. Perkey
*Attorney, Agent, or Firm*—Shapiro and Shapiro

[57] ABSTRACT

A camera control device is provided with a determination device for dividing the image frame into plural areas including a central area and determining the object distance in each of the areas; a focal length detecting device for detecting the focal length of a phototaking lens; an eye-gaze direction detecting device for detecting the position of the eye-gaze of the user, corresponding to one of the areas of the image frame, thereby specifying the area desired by the user; a phototaking magnification calculating device for calculating the phototaking magnification in each of the areas, based on the output of the focal length detecting device and that of the determination device; and an area selecting device for selecting either the central area in case the phototaking magnification in the central area, calculated by the above-mentioned calculating device exceeds a predetermined value, or an area specified by the eye-gaze direction detecting device in case the above-mentioned predetermined value is not exceeded.

30 Claims, 3 Drawing Sheets

CAMERA CONTROL DEVICE

This is a continuation of application Ser. No. 08/605,363 filed Feb. 22, 1996 (abandoned), which is a continuation of application Ser. No. 08/386,215 filed Feb. 9, 1995 (now U.S. Pat. No. 5,515,130, issued May 7, 1996), which is a continuation of application Ser. No. 08/233,082 filed Apr. 25, 1994 (abandoned), which is a continuation of application Ser. No. 07/801,042 filed Dec. 3, 1991 (abandoned).

CROSS-REFERENCE TO A RELATED APPLICATION

Reference is made to the following commonly assigned copending applications:

(1) Ser. No. 774,976 (abandoned) entitled APPARATUS FOR ORDERING TO PHOTOTAKE WITH EYE-DETECTION, and filed Oct. 15, 1991 in the name of Tadao Takagi, Ken Utagawa, Toshimi Watanabe, Minoru Kato, Yoshiro Takeuchi and Hideya Inoue.

(2) Ser. No. 773,726 (abandoned) entitled CAMERA CAPABLE OF DETECTING EYE-GAZE and filed on Oct. 9, 1991 in the name of Shigeyuki Uchiyama, Tadao Takagi, Daisuke Saya, Yuji Katano, Shigemasa Sato and Toshimi Watanabe.

BACKGROUND OF THE INVENTION

1. Field of the Invention

The present invention relates to a camera control device capable of detecting the eye-gaze direction of the user.

2. Related Background Art

The conventional camera control device of this sort effects focusing control of the phototaking lens, based on the distance measured in an area, corresponding to the viewing position (direction) of the eye-gaze of the user, as disclosed for example in Japanese Patent Laid-open Application No. 1-241511.

However, since priority is always given to the position of the eye-gaze regardless of the condition of the object, the main object may appear unfocused in the photograph under certain phototaking conditions.

Also an already known camera control device of this sort detects the position of the eye-gaze of the user, and, if the viewing time at a position is at least equal to a predetermined time and if the shutter release button is depressed by a half stroke, the device fixes the position of the eye-gaze, and then the shutter is released by a full-stroke depression of the shutter release button (Japanese Patent Laid-open Application No. 2-32312).

However, for a user who is accustomed to such half-stroke depression of the shutter release button for the preparation of a phototaking operation, the position of the eye-gaze may become fixed unexpectedly and the distance-measuring area is fixed by the information on the unwanted position, so that the obtained photograph may appear unfocused.

Moreover, if the shutter release button is half-stroke depressed while the position of the eye-gaze is not fixed yet, the shutter may be released while necessary information is not yet obtained.

SUMMARY OF THE INVENTION

In consideration of the foregoing, an object of the present invention is to provide a camera control device capable, in case of presence of a main object in the image field configuration, of giving priority to such main object instead of the position of the eye-gaze, thereby selecting the main object intended by the user and preventing phototaking operation in the unfocused state.

Another object of the present invention is to provide a camera control device not associated with the above-mentioned drawbacks and capable, in a control system of an auto focusing camera, of exactly selecting the object intended by the user, through the detection of the eye-gaze of said user.

The above-mentioned objects can be attained, according to the present invention, by a camera control device provided with distance measuring means which independently measures the phototaking distance to objects respectively present in plural distance measuring areas including the control part of the image field; lens drive means for driving a phototaking lens to an in-focus position according to the output of said distance measuring means; focal length detection means for detecting the focal length of said phototaking lens; and eye-gaze direction detection means for detecting the position of the line of vision of the user, corresponding to one of said distance measuring areas in the image field, comprising:

phototaking magnification calculation means for calculating the phototaking magnification in each of said distance measuring areas, based on the output of said focal length detection means and the output of said distance measuring means; and area selection means for selecting either the central distance measuring area in case the phototaking magnification of the central area, calculated by said phototaking magnification calculation means, exceeds a predetermined value, or a distance measuring area corresponding to the position of the eye-gaze detected by said eye-gaze direction detection means in case said calculated magnification does not exceed said predetermined value.

In a first embodiment of the present invention, there is provided a camera control device provided with distance measuring means which independently measures the phototaking distance to objects respectively present in plural distance measuring areas including the central part of the image field; lens drive means for driving a phototaking lens to an in-focus position according to the output of said distance measuring means; and eye-gaze direction detection means for detecting the position of the eye-gaze of the user in said image field, comprising:

control means which is adapted to effect focusing control on said lens drive means by selecting the central distance measuring area of said distance measuring means in case the selection of the distance measuring area by said eye-gaze direction detection means is not possible.

In a second embodiment, there is provided control means, which is adapted to effect focusing control on said lens drive means by selecting the central distance measuring area of said distance measuring means, in case a phototaking start signal is generated before the lapse of a period required by said eye-gaze direction detection means for selecting a distance measuring area.

In a 3rd embodiment, there is provided a camera control device provided with distance measuring means which independently measures the phototaking distance to objects respectively present in plural distance measuring areas including the central part of the image field; lens drive means for driving a phototaking lens to an in-focus position according to the output of said distance measuring means; and eye-gaze direction detection means for detecting the position of the eye-gaze of the user in said image field, comprising:

control means which is adapted to effect focusing control on said lens drive means by selecting one of the distance measuring areas of said distance measuring means when the position of the eye-gaze of the user continues to stay in said area in excess of a predetermined period.

In a 4th embodiment, there is provided a camera control device, provided with distance measuring means which independently measures the phototaking distances to objects respectively present in plural distance measuring areas including the central part of the image field; lens drive means for driving a phototaking lens to an in-focus position according to the output of said distance measuring means; and eye-gaze direction detection means for detecting the position of the eye-gaze of the user in said image field, comprising:

control means which is adapted to effect focusing control on said lens drive means by selecting one of the distance measuring areas of said distance measuring means when the position of the eye-gaze of the user continues to stay in said area in excess of a predetermined time, or the central distance measuring area when the continuous stay time of the eye-gaze does not exceed said predetermined time in any of the distance measuring areas.

In a 5th embodiment, there is provided a camera control device, provided with distance measuring means which independently measures the phototaking distances to objects respectively present in plural distance measuring areas including the central part of the image field; lens drive means for driving a phototaking lens to an in-focus position according to the output of said distance measuring means; and eye-gaze direction detection means for detecting the position of the eye-gaze direction of the user in said image field, comprising:

control means which is adapted to effect focusing control on said lens drive means by selecting one of said distance measuring areas when the cumulative stay time of the eye-gaze in said distance measuring area exceeds a predetermined time.

In a 6th embodiment, there is provided a camera control device, provided with distance measuring means for independently measuring the phototaking distances to objects respectively present in plural distance measuring areas including the central part of the image field; lens drive means for driving a phototaking lens to an in-focus position according to the output of said distance measuring means; and eye-gaze direction detection means for detecting the position of the eye-gaze of the user in said image field, comprising:

control means which is adapted to effect focusing control on said lens drive means by selecting one of said distance measuring areas when the cumulative stay time of the eye-gaze in said distance measuring area exceeds a predetermined time, or the central distance measuring area in case the cumulative stay time of the eye-gaze does not exceed said predetermined time in any of the distance measuring areas.

In a 7th embodiment, there is provided a camera control device, provided with distance measuring means which independently measures the phototaking distances to objects respectively present in plural distance measuring areas in the image field; lens drive means for driving a phototaking lens to an in-focus position according to the output of said distance measuring means; and eye-gaze direction detection means for detecting the position of the eye-gaze of the user in said image field, comprising:

control means which is adapted to effect focusing control on said lens drive means by selecting one of said distance measuring areas in case the continuous stay time of the eye-gaze in said distance measuring area exceeds a first predetermined time or in case said continuous stay time does not exceed said first predetermined time but the cumulative stay time of the eye-gaze in said area exceeds a second predetermined time.

In an 8th embodiment, there is provided a camera control device, provided with distance measuring means which independently measures the phototaking distances to objects respectively present in plural distance measuring areas in the image field; lens drive means for driving a phototaking lens to an in-focus position according to the output of said distance measuring means; and eye-gaze direction detection means for detecting the position of the eye-gaze of the user in said image field, comprising:

control means which is adapted to effect focusing control on said lens drive means by selecting one of said distance measuring areas in case the continuous stay time of the eye-gaze in said distance measuring area exceeds a first predetermined time or in case said continuous stay time does not exceed said first predetermined time but the cumulative stay time of the eye-gaze in said area exceeds a second predetermined time, or the central distance measuring area in case the cumulative stay time of the eye-gaze does not exceed said second predetermined time in any of the distance measuring areas.

According to the embodiments mentioned above, the distance measurement can be effected in either of the area where the user continues to look, the area where the stay of the eye-gaze of the user is not continuous but longest in cumulative manner and the central distance measuring area, or combinations thereof.

DESCRIPTION OF THE PREFERRED EMBODIMENTS

Figure 1:
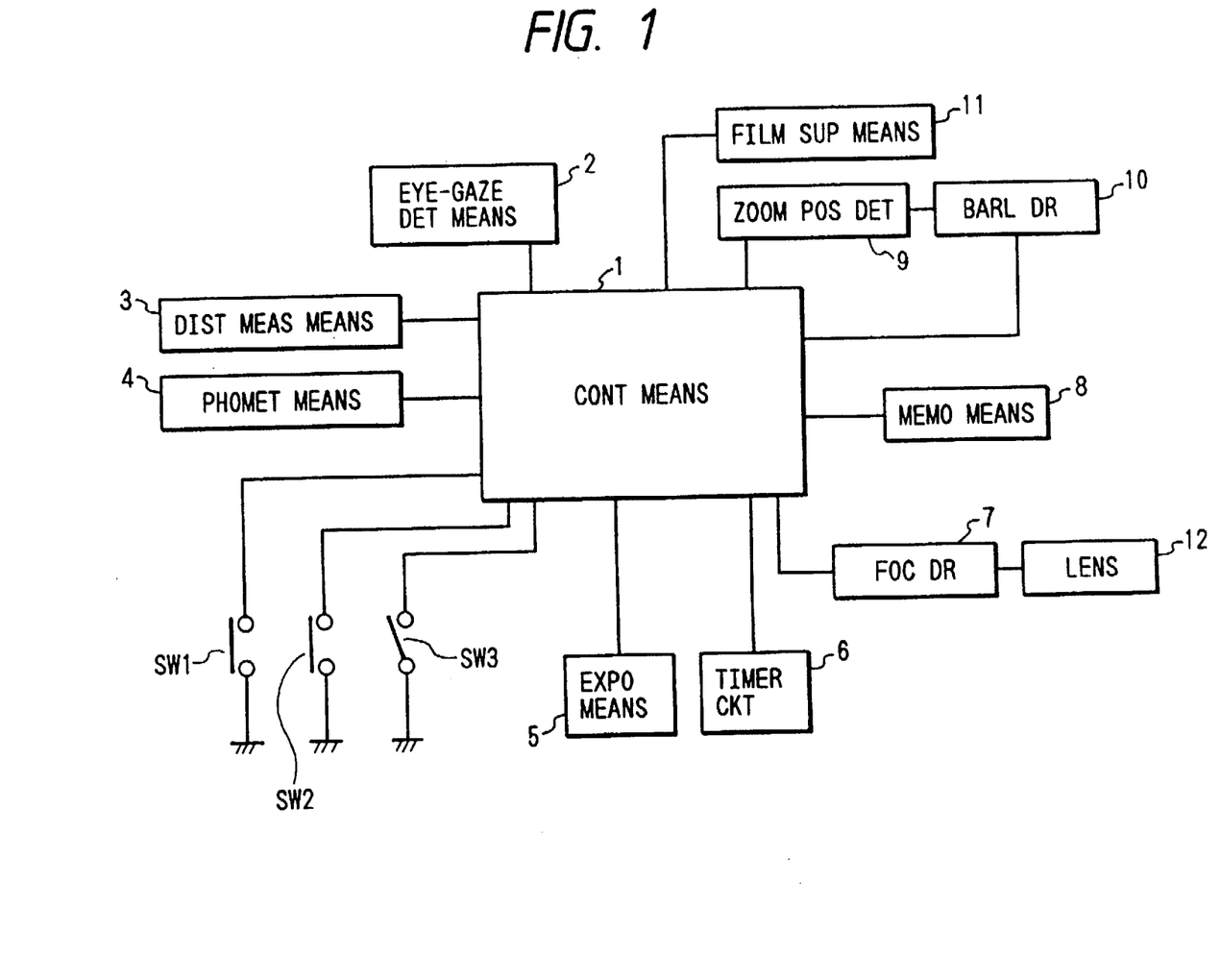
FIG. 1 is a block diagram of a camera control device embodying the present invention.
Figure 2:
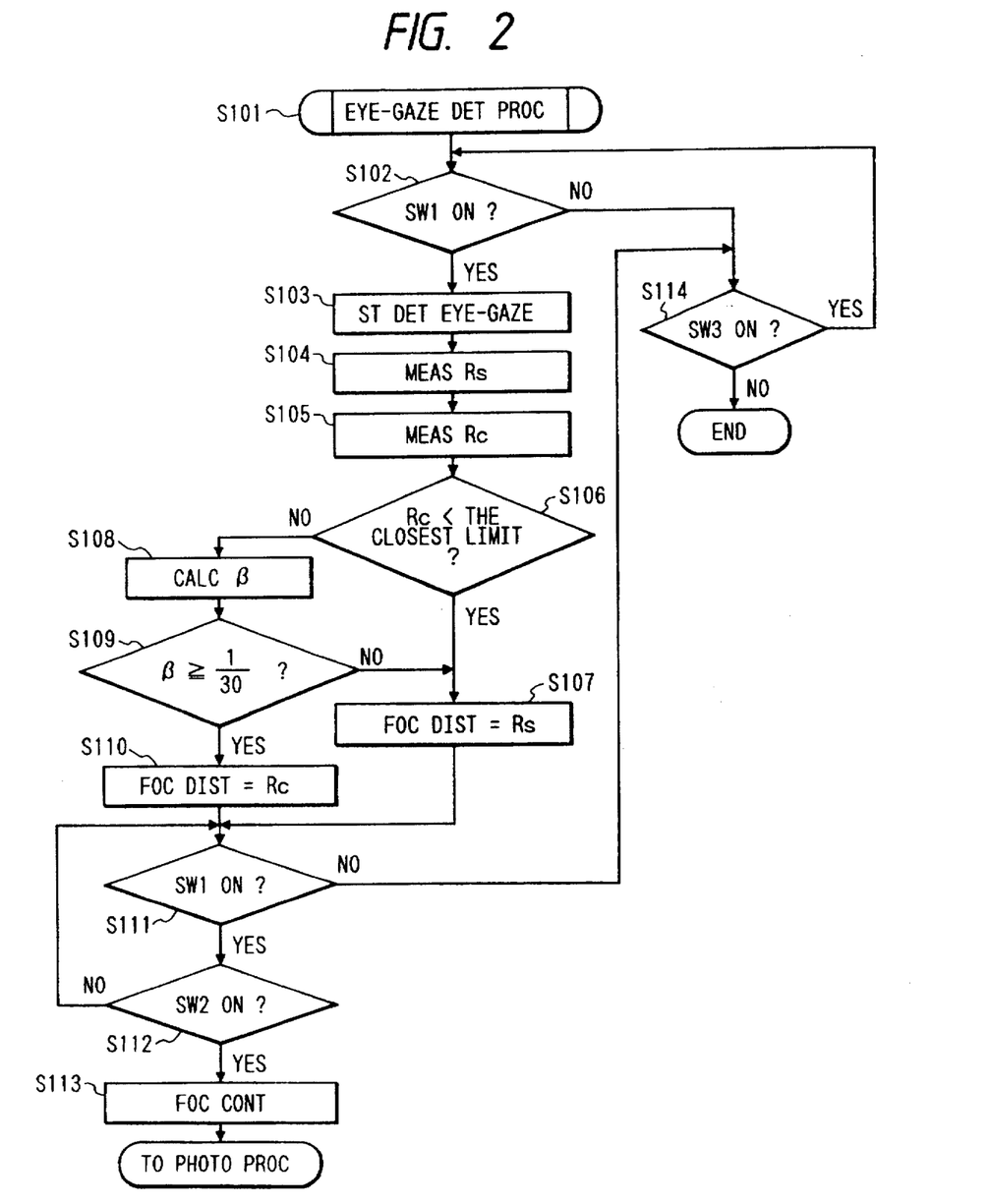
FIG. 2 is a flow chart showing the control sequence of an embodiment of the present invention.

Now the present invention will be clarified in detail by embodiments thereof shown in the attached drawings, wherein FIGS. 1 and 2 are respectively a block diagram and a flow chart of a camera control device embodying the present invention.

As shown in FIG. 1, the camera control device of said embodiment is provided with control means 1 as a central component for controlling the camera system, and, to said control means 1, there are connected eye-gaze direction detection means 2, distance measuring means 3, light metering means 4, exposure means 5, a timer circuit 6, lens drive means 7, memory means 8, zoom position detection means 9, lens barrel drive means 10, film feeding means 11, a half-stroke switch SW1, a shutter release switch SW2, an eye-gaze mode setting switch SW3 etc.

The eye-gaze direction detection means 2 serves to detect the viewing point of the eye-gaze of the user in a view finder, for example by projecting an infrared illuminating light to the eye of the user and detecting said viewing point from a reflected image from the cornea or the lenticular of the eye, as disclosed for example in Japanese Patent Laid-open Application No. 1-274736.

The distance measuring means 3 serves to measure the distance to the object, and the obtained data are used by the control means 1 for calculating the amount of movement of a phototaking lens 12 for focusing.

The light metering means 4 serves to measure the light intensity in plural areas in the image field, based on the light incident from a light metering window, and the obtained data are used by the control means 1 for calculating the exposure value and determining the luminosity of the object field.

The exposure means 5 serves to control the shutter speed and the diaphragm aperture value, according to the exposure value calculated by the control means 1.

The timer circuit 6 serves to set various periods required for the control by the control means 1, according to the data from the above-mentioned means 2, 3, 4 etc. In the present embodiment it is used for detecting a continuous time in which the eye-gaze, detected by the eye-gaze direction detection means 2, continuously stays within a predetermined range, or a cumulative time in which the eye-gaze stays continuously or intermittently in such range.

The lens drive means 7 serves to drive the phototaking lens 12, according to the amount of lens movement calculated by the control means 1 based on the focal position detected by the distance measuring means 3.

The memory means 8 is composed of a memory device for real-time storage of the data of the means 2, 3, 4 etc. required for data processing in the control means 1, for example the continuous stay time of the eye-gaze, at a position detected by the eye-gaze direction detection means 2.

The zoom position detection means 9 serves to monitor the focal length of the photo-taking lens 12, from the amount of movement of the barrel thereof, detected by an encoder or a pulse counter.

The barrel drive means 10 serves to drive the barrel of the phototaking lens 12, according to a value calculated by the control means 1, based on a setting operation.

The film feed means 11 serves to advance the film by an image frame, according to an instruction from the control means 1 and corresponding to a phototaking operation.

The half-stroke switch SW1 is to be closed when the shutter release button is depressed by a half stroke, and the shutter release switch SW2 is to be closed when said button is fully depressed. The eye-gaze mode switch SW3 serves to activate the present embodiment. The above-mentioned switches SW1, SW2 and SW3 are constantly monitored by the control means 1 and are turned on by the user.

In the following the function of the present embodiment will be explained according to a flow chart shown in FIG. 2, while making reference to FIG. 1. At first a step S101 sets the initial values for the control of the entire system, on a condition that the eye-gaze mode switch SW3 is closed (S114).

Then a step S102 discriminates whether the half-stroke switch SW1 is on, and the sequence proceeds to a step S103 or S114 respectively if said switch SW1 is on or not. In the step S114, the control means 1 monitors the eye-gaze mode switch SW3, and the sequence returns to the step S102 if it is on, but the eye-gaze mode control is terminated if said switch is off.

The step S103 causes the eye-gaze direction detection means 2 to initiate the detection of the eye-gaze, thereby enabling constant monitoring of the position of the eye-gaze. Then a step S104 causes the distance measuring means 3 to measure the object distance Rs in an area corresponding to the position of the eye-gaze detected by the eye-gaze direction detection means 2. A step S105 then measures the object distance Rc in the central area.

A next step S106 discriminates whether the object distance Rc in the central area is shorter than a closest limit, and the sequence proceeds to a step S107 if said object distance is shorter than the closest limit, or to a step S108 if said object distance is equal to or longer than the closest limit. The step S107 selects the object distance Rs of the area corresponding to the position of the eye-gaze as the distance of the object to be focused.

The step S108 calculates the phototaking magnification β=f/Rc in the central area, from the focal length f detected by the zoom position detection means 9 and the object distance Rc of the central area determined in the step S105. Then a step S109 discriminates whether the phototaking magnification β of the central area is at least equal to a preset value, and if affirmative, the sequence proceeds to a step S110. If not, the sequence proceeds to the step S107. In case of a close-up shot of a human face with a 35 mm camera, said preset value is preferably selected around 1/30. The step S110 selects the object distance Rc of the central area as the distance of object to be focused.

A next step S111 causes the control means 1 to discriminate whether the half-stroke switch SW1 is on, and the sequence proceeds to a step S112 or S114 respectively if the half-stroke switch SW1 is on or not. The step S112 causes the control means 1 to discriminate whether the shutter release switch SW2 is on, and, if on, the sequence proceeds to a phototaking operation through a focusing control in a step S113, but, if off, the sequence returns to the step S111.

As detailedly explained in the foregoing, the camera control device of the present invention gives priority to an object at the central part of the image field instead of the position of the eye-gaze in case said object constitutes the main component of the image configuration, so that the obtained photograph does not appear unfocused in a major part of the image field.

In the following there will be explained the function of another embodiment according to a flow chart shown in FIG. 3, with reference again to FIG. 1. At first a step S201 sets the initial values for the control of the entire system, such as an initial value t1 for discriminating the continuous stay time and an initial value t2 for discriminating the cumulative stay time, on a condition that the eye-gaze mode switch SW3 is closed (step S231).

Figure 3:
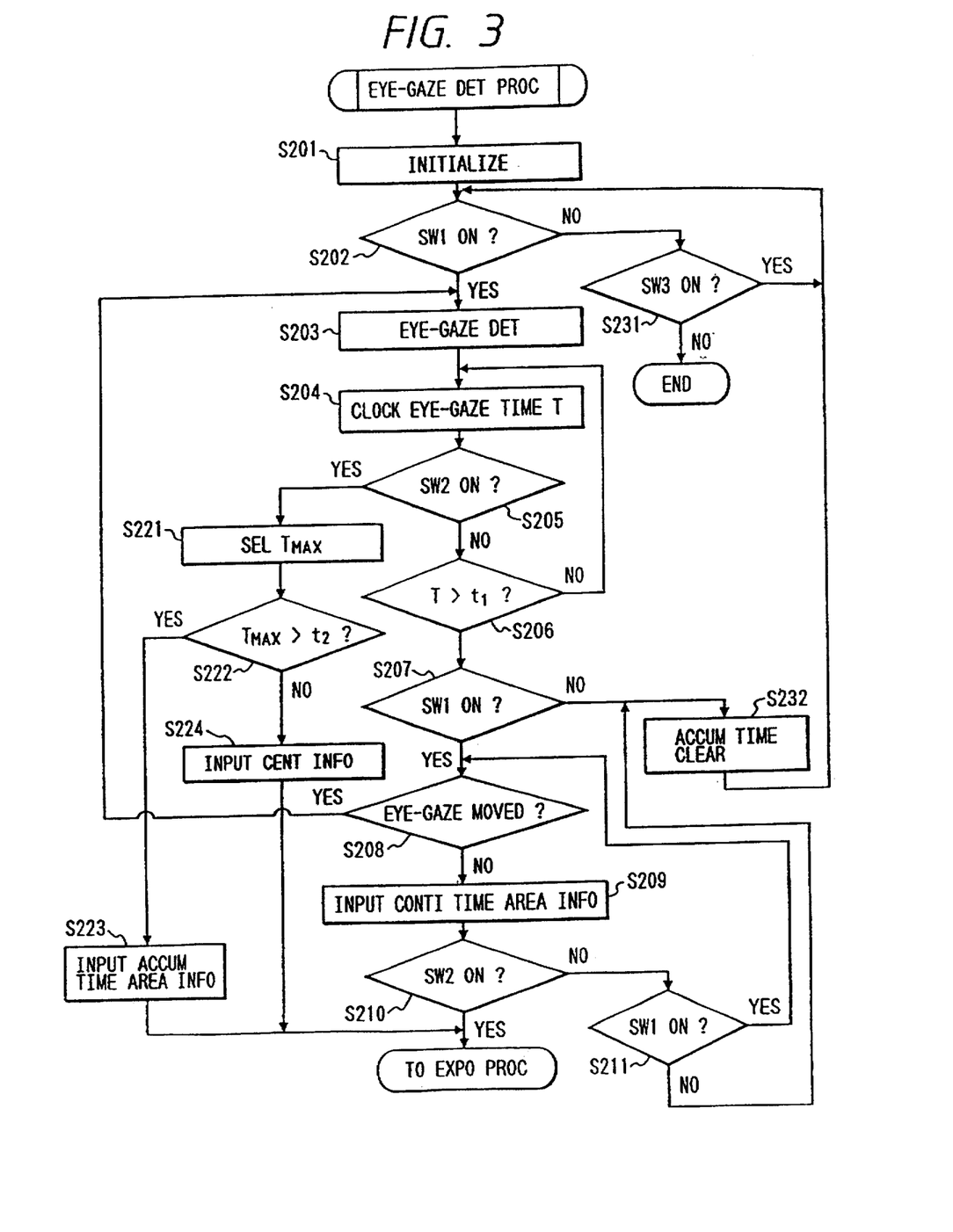
FIG. 3 is a flow chart showing another control sequence of an embodiment of the present invention.

Then a step S202 causes the control means 1 to discriminate whether the half-stroke switch SW1 is on, and the sequence proceeds to a step S203 or S231 respectively if said switch SW1 is on or not. In the step S231, the control means 1 monitors the eye-gaze mode switch SW3, and, if said switch SW3 is on, the sequence returns to the step S202 but, if it is off, the eye-gaze mode control is terminated.

A step S203 causes the eye-gaze direction detection means 2 to initiate the detection of the eye-gaze, thereby enabling constant monitoring of the position of the eye-gaze.

Step S204 to S206 constitute a routine for discriminating the continuous stay time of the eye-gaze. A step S204 provides the timer circuit 6 with a viewing time T during which the eye-gaze stays within a predetermined area for eye-gaze direction detection, based on the position of the eye-gaze detected in the step S203. Then a step S205 causes the control means 1 to discriminate whether the shutter release switch SW2 is on, and the sequence proceeds to a step S221 for discriminating the cumulative time or to a step S206 respectively if said shutter release switch SW2 is on or not. The step S206 compares the viewing time T with the preset value t1 for discrimination of continuous stay time, and the sequence proceeds to a step S207 if said preset value is exceeded. If the preset value is not exceeded, the sequence returns to the step S204 for repeating the above-explaiend routine.

In the step S207, the control means 1 discriminates the state of the half-stroke switch SW1, and, if on, the preparation for phototaking operation is continued and the sequence proceeds to a step S208. If said switch SW1 is off, the detection of the eye-gaze is considered disregarded and the sequence proceeds to a step S232. The step S232 clears the current cumulative times, and, since the half-stroke switch SW1 is off, the sequence returns to the step S202 for effecting the detection anew.

The step S208 causes the vision line detection means 2 to discriminate whether the eye-gaze has moved, and the sequence returns to the step S203 if the movement of the eye-gaze is detected, or it proceeds to a step S209 if such movement is not detected. In the step S209, the control means 1 fetches the information of the continuously viewed area, and calculates various information for phototaking by known calculating means, based on the information from various detection means.

Then a step S210 causes the control means 1 to discriminate the state of the shutter release switch SW2, and, if it is on, the sequence proceeds to the exposure process for effecting a phototaking operation. If it is off, the sequence proceeds to a step S211 in which the control means 1 discriminates the state of the half-stroke switch SW1. If it is on, the sequence returns to the step S208 for continuing the detection, and, if off, the sequence returns to the step S232.

Steps S221 to S224 constitute a routine for discriminating the cumulative time. A step S221 selects the largest viewing time TMAX, that is the longest of the viewing time T until the switch SW2 is turned on in the step S205. A step S222 compares the largest viewing time TMAX obtained in the step S221 with a preset value t2 for discriminating the cumulative time, and, if the preset value t2 is exceeded, the sequence proceeds to a step S223 in which the control means 1 fetches the information of the area corresponding to said cumulative time. After the calculation in a similar manner as explained above, the exposure operation is conducted.

On the other hand, if the largest viewing time TMAX does not exceed the preset value t2, the distance measuring area is not selected according to the detection of the eye-gaze, and a step S224 causes the control means 1 to fetch the information of the central area of the distance measuring means 3. After the calculation in a similar manner as explained above, the exposure operation is conducted.

The preset value t1 for discriminating the continuous stay time and the preset value t2 for discriminating the cumulative stay time are selected in the following manner. Basically, these preset values are preferably so selected as to satisfy a relation t1≦t2. When the eye-gaze is not fixed, there is also accumulated, for example, the time of mere passing of the eye-gaze or the time of sporadic movement of the eye-gaze, resulting from the eyeball movement at the eyelid flickering. In consideration of such meaningless time factors, there is preferred a relationship t1≦t2. However, in case of t1>0.5 seconds, there may also be selected a relationship t1>t2. 0.5 seconds correspond to the human reaction time to a stimulus, and may be considered as a fixed gaze.

When the eye-gaze is not fixed, the individual stay time of the eye-gaze in each area can be considered almost constant, so that the cumulative time becomes longer in proportion to the number of times of the viewing in said area. Consequently this mode is suitable for focusing to an object which has not been looked at but has been viewed frequently.

As detailedly explained in the foregoing, the camera control device of the present invention allows distance measurement in an area in which the eye-gaze has stayed continuously, or an area in which the line of vision has not stayed continuously but stayed longest in cumulative manner, or a central area, or a combination thereof, so that an unfocused photograph is not obtained even if the shutter releasing operation is initiated before the eye-gaze becomes fixed.

What is claimed is:

1. A control device comprising:
    an operating device capable of automatically performing an operation in relation to plural areas of a viewing field;
    an eye-gaze direction detector to detect an eye-gaze position of a user, corresponding to one of the areas of said viewing field, thereby specifying an area desired by the user; and
    a controller which, in case no area is specified by said eye-gaze direction detector, selects a predetermined area of said viewing field that is independent of eye-gaze direction detection, thereby causing said operating device to perform said operation with respect to said predetermined area.

2. A control device comprising:
    an operating device capable of automatically performing an operation in relation to plural areas of a viewing field;
    an eye-gaze direction detector to detect an eye-gaze position of a user, corresponding to one of the areas of said viewing field, thereby specifying an area desired by the user; and
    a controller which is connected to said eye-gaze direction detector to receive a signal therefrom and is connected to said operating device to send a signal thereto, and which, in case no area is specified by said eye-gaze direction detector, selects a predetermined area of said viewing field that is independent of eye-gaze direction detection, thereby causing said operating device to perform said operation with respect to said predetermined area.

3. A control method comprising:
    detecting an eye-gaze position of a user;
    determining whether the detected position corresponds to one of plural areas of a viewing field, and designating a specified area desired by the user if a correspondence to one of said areas is determined;
    selecting a predetermined area of said viewing field that is independent of eye-gaze position detecting when no specified area is designated; and
    performing an operation with respect to the predetermined area.

4. A control device comprising:
    an operating device capable of automatically performing a first operation in relation to plural areas of a viewing field;
    an eye-gaze direction detector to detect an eye-gaze position of a user, corresponding to one of the areas of said viewing field, thereby specifying an area desired by the user;
    a start signal generator to generate a start signal for initiating a second operation; and a controller which selects a predetermined area of said viewing field that is independent of eye-gaze direction detection, in case said start signal is generated prior to the area specification by said eye-gaze direction detector, thereby causing said operating device to perform said first operation with respect to said predetermined area.

5. A control device comprising:

an operating device capable of automatically performing a first operation in relation to plural areas of a viewing field;

an eye-gaze direction detector to detect an eye-gaze position of a user, corresponding to one of the areas of said viewing field, thereby specifying an area desired by the user;

a start signal generator to generate a start signal for initiating a second operation; and a controller which is connected to said eye-gaze direction detector and to said start signal generator to receive signals therefrom and is connected to said operating device to send a signal thereto, and which selects a predetermined area of said viewing field that is independent of eye-gaze direction detection, in case said start signal is generated prior to the area specification by said eye-gaze direction detector, thereby causing said operating device to perform said first operation with respect to said predetermined area.

6. A control method comprising:

detecting an eye-gaze position of a user corresponding to one of plural areas of a viewing field, thereby specifying an area desired by the user;

generating a start signal for initiating an operating cycle;

selecting a predetermined area of said viewing field that is independent of eye-gaze position detecting, in case said start signal is generated prior to the area specification by said eye-gaze position detecting; and performing an operation with respect to said predetermined area.

7. A control device comprising:

an operating device capable of automatically performing a first operation in relation to plural areas of a viewing field;

an eye-gaze direction detector to detect an eye-gaze position of a user, corresponding to one of the areas of said viewing field, thereby specifying an area desired by the user;

a start signal generator to generate a start signal for initiating a second operation; and a controller which selects a predetermined area of said viewing field that is independent of eye-gaze direction detection, in case said start signal is generated prior to the lapse of a time required for the area specification by said eye-gaze direction detector, thereby causing said operating device to perform said first operation with respect to said predetermined area.

8. A control device comprising:

an operating device capable of automatically performing a first operation in relation to plural areas of a viewing field;

an eye-gaze direction detector to detect an eye-gaze position of a user, corresponding to one of the areas of said viewing field, thereby specifying an area desired by the user;

a start signal generator to generate a start signal for initiating a second operation; and a controller which is connected to said eye-gaze direction detector and to said start signal generator to receive signals therefrom and is connected to said operating device to send a signal thereto, and which selects a predetermined area of said viewing field that is independent of eye-gaze direction detection, in case said start signal is generated prior to the lapse of a time required for the area specification by said eye-gaze direction detector, thereby causing said operating device to perform said first operation with respect to said predetermined area.

9. A control method comprising:

detecting an eye-gaze position of a user corresponding to one of plural areas of a viewing field, thereby specifying an area desired by the user;

generating a start signal for initiating an operating cycle;

selecting a predetermined area of said viewing field that is independent of eye-gaze position detection, in case said start signal is generated prior to the lapse of a time required for the area specification by said eye-gaze position detecting; and performing an operation with respect to said predetermined area.

10. A control device comprising:

a determination device to determine information relating to a first parameter in plural areas of a viewing field;

an eye-gaze direction detector to detect an eye-gaze position of a user, corresponding to one of the areas of said viewing field, thereby specifying an area desired by the user;

a calculating device to calculate a second parameter in a predetermined one of said areas, based on an output of said determination device; and an area selection device which selects said predetermined area in case the second parameter in said predetermined area, calculated by said calculating device, is outside a predetermined range, or an area specified by said eye-gaze direction detector in case said second parameter in said predetermined area is not outside said predetermined range.

11. A control device comprising:

a determination device to determine information relating to a first parameter in plural areas of a viewing field;

an eye-gaze direction detector to detect an eye-gaze position of a user, corresponding to one of the areas of said viewing field, thereby specifying an area desired by the user;

a calculating device to calculate a second parameter in a predetermined one of said areas, based on an output of said determination device, said calculating device being connected to said determination device to receive said output; and an area selection device which selects said predetermined area in case the second parameter in said predetermined area, calculated by said calculating device, is outside a predetermined range, or an area specified by said eye-gaze direction detector in case said second parameter in said predetermined area is not outside said predetermined range.

12. A control method comprising:

determining a parameter relating to magnification in plural areas of a viewing field;

detecting the focal length of a lens;

detecting an eye-gaze position of a user, corresponding to one of the areas of said viewing field, thereby specifying an area desired by the user;

calculating a magnification in a predetermined area of said viewing field, based on said focal length detecting and said determining; and selecting the predetermined area in case the calculated magnification in the predetermined area exceeds a predetermined value, or an area specified by said eye-gaze position detecting in case the calculated magnification does not exceed said predetermined value.

13. A control device comprising:

an operating device capable of automatically performing an operation in relation to plural areas of a viewing field;

an eye-gaze direction detector to detect an eye-gaze position of a user, corresponding to one of the areas of said viewing field, thereby specifying an area of said viewing field;

a controller which selects either a specified area of said viewing field, in case said eye-gaze direction detector detects a continuous stay of the eye-gaze of the user in said specified area at least for a predetermined time, thereby causing said operating device to perform said operation with respect to said specified area, or a predetermined area of said viewing field that is independent of eye-gaze direction detection, in case said eye-gaze direction detector detects that the eye-gaze of the user has stayed less than said predetermined time in all of said areas, thereby causing said operating device to perform said operation with respect to said predetermined area.

14. A control device comprising:

an operating device capable of automatically performing an operation in relation to plural areas of a viewing field;

an eye-gaze direction detector to detect an eye-gaze position of a user, corresponding to one of the areas of said viewing field, thereby specifying an area of said viewing field;

a controller which is connected to said eye-gaze direction detector to receive a signal therefrom and is connected to said operating device to send a signal thereto, and which selects either a specified area of said viewing field, in case said eye-gaze direction detector detects a continuous stay of the eye-gaze of the user in said specified area at least for a predetermined time, thereby causing said operating device to perform said operation with respect to said specified area, or a predetermined area of said viewing field that is independent of eye-gaze direction detection, in case said eye-gaze direction detector detects that the eye-gaze of the user has stayed less than said predetermined time in all of said areas, thereby causing said operating device to perform said operation with respect to said predetermined area.

15. A control method comprising:

detecting an eye-gaze position of a user relative to plural areas of a viewing field to determine whether the eye-gaze position corresponds to one of the areas of said viewing field, and designating a specified area of said viewing field if a correspondence to one of said areas is determined;

selecting either the specified area of said viewing field, in case said eye-gaze detecting detects a continuous stay of the eye-gaze of the user in said specified area at least for a predetermined time, or a predetermined area of said viewing field that is independent of eye-gaze detecting, in case said eye-gaze detecting detects that the eye-gaze of the user has stayed less than said predetermined time in all of said areas; and performing an operation with respect to the selected area.

16. A control device comprising:

an operating device capable of automatically performing an operation in relation to plural areas of a viewing field;

an eye-gaze direction detector to detect an eye-gaze position of a user, corresponding to one of the areas of said viewing field, thereby specifying an area of said viewing field; and a controller which selects a specified area of said viewing field, in case said eye-gaze direction detector detects that the eye-gaze of the user has stayed in said specified area at least for a predetermined time that is an accumulation of discontinuous periods in which the eye-gaze of the user has stayed in said specified area, thereby causing said operating device to perform said operation with respect to said specified area.

17. A control device comprising:

an operating device capable of automatically performing an operation in relation to plural areas of a viewing field;

an eye-gaze direction detector to detect an eye-gaze position of a user, corresponding to one of the areas of said viewing field, thereby specifying an area of said viewing field; and a controller which is connected to said eye-gaze direction detector to receive a signal therefrom and is connected to said operating device to send a signal thereto, and which selects a specified area of said viewing field, in case said eye-gaze direction detector detects that the eye-gaze of the user has stayed in said specified area at least for a predetermined time that is an accumulation of discontinuous periods in which the eye-gaze of the user has stayed in said specified area, thereby causing said operating device to perform said operation with respect to said specified area.

18. A control method comprising:

detecting an eye-gaze position of a user relative to plural areas of a viewing field to determine whether the eye-gaze position corresponds to one of the areas of said viewing field, and designating a specified area of said viewing field if a correspondence to one of said areas is determined;

selecting the specified area of said viewing field, in case said eye-gaze detecting detects that the eye-gaze of the user has stayed in said specified area at least for a predetermined time that is an accumulation of discontinuous periods in which the eye-gaze of the user has stayed in said specified area; and performing an operation with respect to the selected area.

19. A control device comprising:

an operating device capable of automatically performing an operation in relation to plural areas of a viewing field;

an eye-gaze direction detector to detect an eye-gaze position of a user, corresponding to one of the areas of said viewing field, thereby specifying an area of said viewing field; and a controller which selects either a specified area of said viewing field, in case said eye-gaze direction detector detects that the eye-gaze of the user has stayed in said specified area at least for a predetermined time in a cumulative manner, thereby causing said operating device to perform said operation with respect to said specified area, or a predetermined area that is independent of eye-gaze direction detection, in case said eye-gaze direction detector detects that the eye-gaze of the user has stayed less than said predetermined time in all of said areas, thereby causing said operating device to perform said operation with respect to said predetermined area.

20. A control device comprising:

an operating device capable of automatically performing an operation in relation to plural areas of a viewing field;

an eye-gaze direction detector to detect an eye-gaze position of a user, corresponding to one of the areas of said viewing field, thereby specifying an area of said viewing field; and a controller which is connected to said eye-gaze direction detector to receive a signal therefrom and is connected to said operating device to send a signal thereto, and which selects either a specified area of said viewing field, in case said eye-gaze direction detector detects that the eye-gaze of the user has stayed in said specified area at least for a predetermined time in a cumulative manner, thereby causing said operating device to perform said operation with respect to said specified area, or a predetermined area that is independent of eye-gaze direction detection, in case said eye-gaze direction detector detects that the eye-gaze of the user has stayed less than said predetermined time in all of said areas, thereby causing said operating device to perform said operation with respect to said predetermined area.

21. A control method comprising:

detecting an eye-gaze position of a user relative to plural areas of a viewing field to determine whether the eye-gaze position corresponds to one of the areas of said viewing field, and designating a specified area of said viewing field if a correspondence to one of said areas is determined;

selecting either the specified area of said viewing field, in case said eye-gaze detecting detects that the eye-gaze of the user has stayed in said specified area at least for a predetermined time in a cumulative manner, or a predetermined area that is independent of eye-gaze position detecting, in case said eye-gaze detecting detects that the eye-gaze of the user has stayed less than said predetermined time in all of said areas; and performing an operation with respect to the selected area.

22. A control device comprising:

an operating device capable of automatically performing an operation in relation to plural areas of a viewing field;

an eye-gaze direction detector to detect an eye-gaze position of a user, corresponding to one of the areas of said viewing field, thereby specifying an area of said viewing field; and a controller which selects a specified area of said viewing field, in case said eye-gaze direction detector detects that the eye-gaze of the user has stayed in said specified area at least for a first predetermined time, thereby causing said operating device to perform said operation with respect to said specified area, or in case said eye-gaze direction detector detects that the eye-gaze of the user has stayed less than said first predetermined time in all of the areas but has stayed in said specified area at least for a second predetermined time that is an accumulation of discontinuous periods in which the eye-gaze of the user has stayed in said specified area, thereby causing said operating device to perform said operation with respect to said specified area.

23. A control device comprising:

an operating device capable of automatically performing an operation in relation to plural areas of a viewing field;

an eye-gaze direction detector to detect an eye-gaze position of a user, corresponding to one of the areas of said viewing field, thereby specifying an area of said viewing field; and a controller which is connected to said eye-gaze direction detector to receive a signal therefrom and is connected to said operating device to send a signal thereto, and which selects a specified area of said viewing field, in case said eye-gaze direction detector detects that the eye-gaze of the user has stayed in said specified area at least for a first predetermined time, thereby causing said operating device to perform said operation with respect to said specified area, or in case said eye-gaze direction detector detects that the eye-gaze of the user has stayed less than said first predetermined time in all of the areas but has stayed in said specified area at least for a second predetermined time that is an accumulation of discontinuous periods in which the eye-gaze of the user has stayed in said specified area, thereby causing said operating device to perform said operation with respect to said specified area.

24. A control method comprising:

detecting an eye-gaze position of a user relative to plural areas of a viewing field to determine whether the eye-gaze position corresponds to one of the areas of said viewing field, and designating a specified area of said viewing field if a correspondence to one of said areas is determined;

selecting the specified area of said viewing field, in case said eye-gaze detecting detects that the eye-gaze of the user has stayed in said specified area at least for a first predetermined time, or in case said eye-gaze detecting detects that the eye-gaze of the user has stayed less than the said predetermined time in all of the areas but has stayed in said specified area at least for a second predetermined time that is an accumulation of discontinuous periods in which the eye-gaze of the user has stayed in said specified area; and performing an operation with respect to the selected area.

25. A control device comprising:

an operating device capable of automatically performing an operation in relation to plural areas of a viewing field;

an eye-gaze direction detector to detect an eye-gaze position of a user, corresponding to one of the areas of said viewing field, thereby specifying an area of said viewing field; and a controller which selects a specified area of said viewing field, in case said eye-gaze direction detector detects that the eye-gaze of the user has stayed in said specified area at least for a first predetermined time, thereby causing said operating device to perform said operation with respect to said specified area, or in case said eye-gaze direction detector detects that the eye-gaze of the user has stayed less than said first predetermined time in all of the areas but has stayed in said specified area in a cumulative manner at least for a second predetermined time, thereby causing said operating device to perform said operation with respect to said specified area, or which selects a predetermined area of said viewing field that is independent of eye-gaze direction detection in case the cumulative stay time of the eye-gaze is less than said second predetermined time in all of said areas, thereby causing said operating device to perform said operation with respect to said predetermined area.

26. A control device comprising:

an operating device capable of automatically performing an operation in relation to plural areas of a viewing field;

an eye-gaze direction detector to detect an eye-gaze position of a user, corresponding to one of the areas of said viewing field, thereby specifying an area of the viewing field; and a controller which is connected to said eye-gaze direction detector to receive a signal therefrom and is connected to said operating device to send a signal thereto, and which selects a specified area of said viewing field, in case said eye-gaze direction detector detects that the eye-gaze of the user has stayed in said specified area at least for a first predetermined time, thereby causing said operating device to perform said operation with respect to said specified area, or in case said eye-gaze direction detector detects that the eye-gaze of the user has stayed less than said first predetermined time in all of the areas but has stayed in said specified area in a cumulative manner at least for a second predetermined time, thereby causing said operating device to perform said operation with respect to said specified area, or which selects a predetermined area of said viewing field that is independent of eye-gaze direction detection in case the cumulative stay time of the eye-gaze is less than said second predetermined time in all of said areas, thereby causing said operating device to perform said operation with respect to said predetermined area.

27. A control method comprising:

detecting an eye-gaze position of a user relative to plural areas of a viewing field to determine whether the eye-gaze position corresponds to one of the areas of said viewing field, and designating a specified area of said viewing field if a correspondence to one of said areas is determined;

selecting the specified area of said viewing field, in case said eye-gaze detecting detects that the eye-gaze of the user has stayed in said specified area at least for a first predetermined time, or in case said eye-gaze detecting detects that the eye-gaze of the user has stayed less than said first predetermined time in all of the areas but has stayed in said specified area in a cumulative manner at least for a second predetermined time, or selecting a predetermined area that is independent of eye-gaze position detecting in case the cumulative stay time of the eye-gaze in all of the areas is less than said second predetermined time; and performing an operation with respect to the selected area.

28. A control device comprising:

a determination device to determine information relating to a first parameter in plural areas of a viewing field;

an eye-gaze direction detector to detect an eye-gaze position of a user corresponding to one of the areas of said viewing field, thereby specifying an area desired by the user;

a calculating device to calculate a second parameter in a predetermined one of said areas, based on the output of said determination device; and an area selector which selects said predetermined area in case the second parameter in said predetermined area, calculated by said calculating device, is outside a predetermined range, or an area specified by said eye-gaze direction detector in case said second parameter in said predetermined area is not outside said predetermined range.

29. A control device comprising:

a determination device to determine information relating to a first parameter in plural areas of a viewing field;

an eye-gaze direction detector to detect an eye-gaze position of a user corresponding to one of the areas of said viewing field, thereby specifying an area desired by the user;

a calculating device, which is connected to said determination device to receive an output therefrom, to calculate a second parameter in a predetermined one of said areas, based on the output of said determination device; and an area selector which selects said predetermined area in case the second parameter in said predetermined area, calculated by said calculating device, is outside a predetermined range, or an area specified by said eye-gaze direction detector in case said second parameter in said predetermined area is not outside said predetermined range.

30. A control method comprising:

determining information relating to a first parameter in plural areas of a viewing field;

detecting an eye-gaze position of a user corresponding to one of the areas of said viewing field, thereby specifying an area desired by the user;

calculating a second parameter in a predetermined one of said areas, based on the determined information; and selecting said predetermined area in case the second parameter calculated in said predetermined area is outside a predetermined range, or an area specified by said eye-gaze detecting in case said second parameter in said predetermined area is not outside said predetermined range.

* * * * *